US00RE44895E

(19) United States
(12) Reissued Patent
Nicolas et al.

(10) Patent Number: US RE44,895 E
(45) Date of Reissued Patent: May 13, 2014

(54) INTERACTIVE STEP-TYPE GYMNASTICS PRACTICE DEVICE

(75) Inventors: Frederic Nicolas, Moret-sur-Loing (FR); Frederic Claudel, Paris (FR)

(73) Assignee: Bigben Interactive, SA (FR)

(21) Appl. No.: 13/211,990

(22) Filed: Aug. 17, 2011

Related U.S. Patent Documents

Reissue of:
(64) Patent No.: 7,938,751
Issued: May 10, 2011
Appl. No.: 12/773,627
Filed: May 4, 2010

U.S. Applications:
(60) Division of application No. 11/445,367, filed on Jun. 1, 2006, now Pat. No. 7,722,501, which is a continuation of application No. PCT/FR2004/003083, filed on Dec. 1, 2004.

(30) Foreign Application Priority Data

Dec. 2, 2003 (FR) ..... 03 14150

(51) Int. Cl.
*A63B 15/02* (2006.01)

(52) U.S. Cl.
USPC ..... 482/1

(58) Field of Classification Search
USPC ..... 482/148, 1–9, 51–54, 23, 900–902; 434/250, 247, 307–309, 36, 47
See application file for complete search history.

(56) References Cited

U.S. PATENT DOCUMENTS

D157,436 S * 2/1950 Rogers ..... D25/65
2,731,382 A * 1/1956 Basso et al. ..... 514/274
2,801,490 A * 8/1957 Daves ..... 43/43.1
2,811,753 A * 11/1957 Whitehurst ..... 19/0.23
3,091,454 A * 5/1963 Sam ..... 473/414
3,184,962 A * 5/1965 Gay ..... 73/766
3,350,102 A * 10/1967 Tiernan, Jr. ..... 473/274
3,408,154 A * 10/1968 Bachi, Jr. ..... 431/353

(Continued)

FOREIGN PATENT DOCUMENTS

CA 2411634 5/2003
CA 2381865 A1 10/2003

(Continued)

OTHER PUBLICATIONS

International Search Report; PCT/FR2004/003083; May 11, 2005; 2 pages.
Advertisement for a game from Bandai, found in a Japanese magazine published in May 1987; 4 pages. The Game's Description is available on the YouTube website links http://www.youtube.com/watch?v=NSIrHGBOOhE; and http://www.youtube.com/watch?v=mpttJVLE-7c.

(Continued)

*Primary Examiner* — Lori Baker
(74) *Attorney, Agent, or Firm* — Cantor Colburn LLP

(57) ABSTRACT

The invention relates to an interactive gymnastics practice device which is used together with an image and sound system forming the gymnastics program to be followed by a user, comprising a first level of generally-pressure-sensitive surfaces, the surfaces extending essentially in a continuous manner and in substantially the same plane. The invention is characterized in that the device comprises at least one second level of surfaces which are pressure sensitive or which can control an action in response to a pressure, the second level surfaces extending essentially in a continuous manner and in substantially the same plane.

27 Claims, 4 Drawing Sheets

(56) References Cited

U.S. PATENT DOCUMENTS

| | | | | | |
|---|---|---|---|---|---|
| 3,580,083 | A * | 5/1971 | Zipser | 73/865.4 |
| 3,834,702 | A * | 9/1974 | Bliss | 463/6 |
| 3,927,880 | A * | 12/1975 | Petrusek | 273/138.2 |
| 4,121,488 | A * | 10/1978 | Akiyama | 84/720 |
| 4,136,682 | A * | 1/1979 | Pedotti | 600/592 |
| 4,216,956 | A * | 8/1980 | Yamamura et al. | 482/3 |
| 4,273,934 | A * | 6/1981 | Merger et al. | 560/238 |
| 4,425,104 | A * | 1/1984 | Ojima | 474/111 |
| 4,598,717 | A * | 7/1986 | Pedotti | 600/592 |
| 4,678,192 | A * | 7/1987 | Campbell | 273/157 R |
| 4,720,789 | A * | 1/1988 | Hector et al. | 463/33 |
| 4,726,435 | A * | 2/1988 | Kitagawa et al. | 177/187 |
| 4,739,848 | A * | 4/1988 | Tulloch | 177/211 |
| 4,772,028 | A * | 9/1988 | Rockhold et al. | 463/5 |
| 4,800,973 | A * | 1/1989 | Angel | 177/211 |
| 4,813,665 | A * | 3/1989 | Carr | 482/3 |
| 4,880,069 | A * | 11/1989 | Bradley | 177/211 |
| 4,924,743 | A * | 5/1990 | Tsai | 84/476 |
| 5,049,079 | A * | 9/1991 | Furtado et al. | 434/253 |
| 5,076,584 | A * | 12/1991 | Openiano | 463/36 |
| 5,112,045 | A * | 5/1992 | Mason et al. | 482/9 |
| 5,137,759 | A * | 8/1992 | Vinod | 427/393.4 |
| 5,139,261 | A * | 8/1992 | Openiano | 463/36 |
| 5,260,869 | A * | 11/1993 | Ferrier et al. | 600/595 |
| 5,308,296 | A * | 5/1994 | Eckstein | 482/5 |
| 5,318,284 | A * | 6/1994 | Demmeler et al. | 269/88 |
| 5,348,519 | A * | 9/1994 | Prince et al. | 482/6 |
| 5,402,090 | A * | 3/1995 | Shimizu et al. | 333/206 |
| 5,476,103 | A * | 12/1995 | Nahsner | 600/595 |
| 5,507,708 | A * | 4/1996 | Ma | 482/52 |
| 5,524,637 | A | 6/1996 | Erickson | |
| 5,584,779 | A * | 12/1996 | Knecht et al. | 482/8 |
| 5,613,690 | A * | 3/1997 | McShane et al. | 273/449 |
| 5,627,327 | A * | 5/1997 | Zanakis | 73/862.042 |
| D382,902 | S * | 8/1997 | Feldman | D19/62 |
| 5,683,314 | A * | 11/1997 | Musso | 473/414 |
| 5,687,487 | A * | 11/1997 | Johnson | 33/501.02 |
| 5,837,952 | A * | 11/1998 | Oshiro et al. | 200/86 R |
| 5,838,638 | A * | 11/1998 | Tipton et al. | 368/10 |
| 5,839,976 | A * | 11/1998 | Darr | 473/414 |
| 5,886,302 | A * | 3/1999 | Germanton et al. | 177/199 |
| 5,897,457 | A * | 4/1999 | Mackovjak | 482/8 |
| 5,913,727 | A * | 6/1999 | Ahdoot | 463/39 |
| 5,925,000 | A * | 7/1999 | Marciniak et al. | 600/592 |
| 5,987,982 | A * | 11/1999 | Wenman et al. | 73/379.08 |
| 5,997,442 | A * | 12/1999 | Cordes | 482/52 |
| 6,052,114 | A * | 4/2000 | Morifuji | 345/158 |
| 6,110,073 | A * | 8/2000 | Saur et al. | 482/8 |
| 6,142,913 | A * | 11/2000 | Ewert | 482/8 |
| 6,181,647 | B1 * | 1/2001 | Tipton et al. | 368/10 |
| 6,225,977 | B1 * | 5/2001 | Li | 345/156 |
| 6,227,968 | B1 * | 5/2001 | Suzuki et al. | 463/7 |
| 6,270,414 | B2 * | 8/2001 | Roelofs | 463/36 |
| 6,329,620 | B1 * | 12/2001 | Oishi et al. | 200/86.5 |
| 6,336,891 | B1 * | 1/2002 | Fedrigon et al. | 482/8 |
| 6,387,061 | B1 * | 5/2002 | Nitto | 600/587 |
| 6,389,883 | B1 * | 5/2002 | Berme et al. | 73/65.01 |
| 6,402,635 | B1 * | 6/2002 | Nesbit et al. | 473/269 |
| 6,450,886 | B1 * | 9/2002 | Oishi et al. | 463/36 |
| 6,450,888 | B1 * | 9/2002 | Takase et al. | 463/43 |
| 6,580,060 | B1 * | 6/2003 | Inman et al. | 219/528 |
| 6,628,265 | B2 * | 9/2003 | Hwang | 345/156 |
| 6,685,480 | B2 * | 2/2004 | Nishimoto et al. | 434/247 |
| 6,743,971 | B1 * | 6/2004 | Chen | 84/746 |
| 6,758,753 | B1 * | 7/2004 | Nagata et al. | 463/36 |
| 6,761,563 | B1 * | 7/2004 | Lin | 434/169 |
| 6,765,726 | B2 * | 7/2004 | French et al. | 359/630 |
| 6,776,414 | B1 * | 8/2004 | Messac | 273/284 |
| 6,844,058 | B2 * | 1/2005 | Blum et al. | 428/343 |
| 6,905,413 | B1 * | 6/2005 | Terao et al. | 463/40 |
| 6,916,273 | B2 * | 7/2005 | Couvillion et al. | 482/8 |
| 6,976,939 | B2 * | 12/2005 | Harker et al. | 482/52 |
| 7,038,855 | B2 * | 5/2006 | French et al. | 359/630 |
| 7,060,000 | B2 * | 6/2006 | Carlson | 482/1 |
| 7,145,469 | B2 * | 12/2006 | Kokonaski et al. | 340/815.4 |
| 7,205,903 | B2 * | 4/2007 | Blum et al. | 340/815.4 |
| 7,331,856 | B1 * | 2/2008 | Nakamura et al. | 463/7 |
| 7,337,908 | B2 * | 3/2008 | Dedmon | 206/600 |
| 7,355,134 | B1 * | 4/2008 | Anderson | 200/85 R |
| 7,358,861 | B2 * | 4/2008 | Blum et al. | 340/815.4 |
| 7,361,856 | B1 * | 4/2008 | Anderson | 200/85 R |
| 7,381,153 | B2 * | 6/2008 | Couvillion et al. | 482/8 |
| D573,659 | S * | 7/2008 | Wang | D21/333 |
| 7,436,325 | B2 * | 10/2008 | Bailey | 341/20 |
| 7,456,755 | B2 * | 11/2008 | Blum et al. | 340/815.4 |
| 7,488,177 | B2 * | 2/2009 | Pearson | 434/247 |
| 7,520,840 | B2 * | 4/2009 | Shifferaw | 482/52 |
| 7,722,501 | B2 * | 5/2010 | Nicolas et al. | 482/1 |
| 7,874,961 | B2 * | 1/2011 | McKee et al. | 482/52 |
| 7,938,751 | B2 * | 5/2011 | Nicolas et al. | 482/1 |
| 8,029,417 | B2 * | 10/2011 | McKee et al. | 482/52 |
| 8,079,251 | B2 * | 12/2011 | Miyanaga | 73/65.01 |
| 8,100,770 | B2 * | 1/2012 | Yamazaki et al. | 463/39 |
| 2002/0134593 | A1 * | 9/2002 | Lee | 177/245 |
| 2002/0160823 | A1 | 10/2002 | Watabe et al. | |
| 2004/0102247 | A1 * | 5/2004 | Smoot et al. | 463/36 |
| 2005/0096132 | A1 * | 5/2005 | Ueshima et al. | 463/37 |
| 2006/0183601 | A1 * | 8/2006 | Couvillion et al. | 482/1 |
| 2006/0258512 | A1 | 11/2006 | Nicolas et al. | |

FOREIGN PATENT DOCUMENTS

| | | | |
|---|---|---|---|
| DE | 4425104 | C1 | 2/1996 |
| DE | 10259081 | A1 | 7/2003 |
| DE | 20116364 | T2 | 9/2006 |
| DE | 60116364 | T2 | 9/2006 |
| EP | 0122294 | B1 | 4/1989 |
| EP | 0519836 | A1 | 12/1992 |
| EP | 0996075 | A2 | 4/2000 |
| EP | 1043746 | A1 | 10/2000 |
| EP | 1120083 | A2 | 8/2001 |
| EP | 1127599 | A2 | 8/2001 |
| EP | 1222949 | A2 | 7/2002 |
| FR | 2472929 | A1 | 7/1981 |
| FR | 2587611 | A1 | 3/1987 |
| FR | 2604910 | A1 | 4/1988 |
| FR | 2647331 | A2 | 11/1990 |
| FR | 2792182 | A1 | 10/2000 |
| FR | 2801490 | A1 | 6/2001 |
| FR | 2811753 | A1 | 1/2002 |
| JP | 62034016 | A | 2/1987 |
| JP | 5137759 | A | 6/1993 |
| JP | H09197951 | A | 7/1997 |
| JP | 9253334 | A | 9/1997 |
| JP | 2002112984 | A | 4/2002 |
| JP | 2002157081 | A | 5/2002 |
| JP | 2003235834 | A | 8/2003 |
| KR | 20030002937 | A | 1/2003 |
| KR | 20030073687 | A | 9/2003 |
| WO | 9221412 | A1 | 12/1992 |
| WO | 03061800 | A1 | 7/2003 |

OTHER PUBLICATIONS

"Atari 2600", Wikipedia, 8 pp., http://en.wikipedia.org/wiki/Atari_2600, Oct. 30, 2013.

"Bluetooth", Wikipedia, 9 pp. http://en.wikipedia.org/wiki/Bluetooth, Oct. 30, 2013.

"Bluetooth-Keyboard and -Maus von Microsoft", Aug. 6, 2013.

"Logitech Freedom 2.4 Cordless Joystick", 3 pp., www.logitech.com/lang/pdf/logitech_freedom_cordless_joystick.pdf, Aug. 6, 2013.

Dark Watcher "History of the Game Controller", 3 pp. http://www.videogameconsolelibrary.com/art-controller.htm, Jun. 18, 2013.

"NES Satellite", Wikipedia, 2 pp., http://en.wikipedia.org/wiki/Nes_Satellite, Oct. 30, 2013.

"WaveBird Wireless Controller", Wikipedia, 3 pp., http://en.wikipedia.org/wiki/WaveBird_Wireless_Controller, Oct. 30, 2013.

* cited by examiner

INTERACTIVE STEP-TYPE GYMNASTICS PRACTICE DEVICE

Matter enclosed in heavy brackets [ ] appears in the original patent but forms no part of this reissue specification; matter printed in italics indicates the additions made by reissue.

CROSS-REFERENCE TO RELATED APPLICATIONS

This application is a divisional of U.S. patent application Ser. No. 11/445,367, filed on Jun. 1, 2006 now U.S. Pat. No. 7,722,501, which is a continuation of International patent application PCT/FR2004/003083 filed on Dec. 1, 2004, which designates the United States and claims priority from French patent application No. 0314150 filed on Dec. 2, 2003. The content of all prior applications is incorporated herein by reference. *This is a Reissue Patent Application of U.S. Pat. No. 7,938,751, issued May 10, 2011.*

*Notice: More than one reissue application has been filed for the reissue of U.S. Pat. No. 7,722,501. The reissue applications are application Ser. No. 13/480,177, filed May 24, 2012, which is a continuation reissue of Reissue patent application Ser. No. 13/211,990 (the present application), filed Aug. 17, 2011.*

FIELD OF THE INVENTION

The present invention relates to the field of devices having sensitive surfaces for fun or training purposes for a user watching a program interacting with said devices, i.e. a sound and image system such as a television set connected to a game station or to a digital processing unit. The present invention relates more particularly to an interactive gymnastics training device.

BACKGROUND OF THE INVENTION

A main object of the invention is to constitute a novel fun and exercise interactive peripheral for a digital processing unit such as, for example, a video game console, a computer, or an arcade terminal, making it possible to do interactive sessions of gymnastics of the "stepping" or "step-up" type.

In the prior art, video game peripherals are already known that seek to increase fun and exercise interactions for improved realism when playing video games. Thus, interactive surfboards or other slide boards, or interactive "dance mats" have thus been developed.

An interactive dance mat is generally in the form of a mat made up of various pressure-sensitive surfaces considered as "all or nothing" switches actuated by the feet, the mat being connected to a digital processing unit.

Such mats made up of pressure-sensitive portions and dedicated to video games use are described, for example, in U.S. Pat. No. 5,837,952 or more recently in European Patents Nos. EP 1 043 746 and EP 1 127 599.

Such mats are described in those documents as being plane surfaces of rectangular shape whose various pressure-sensitive portions, which are also rectangular, are disposed around a surface that is not pressure-sensitive and that is placed in the center of the mat.

When the mat has more than four pressure-sensitive zones, the pressure-sensitive portions are disposed along axes of symmetry of the mat considered as being a rectangular plane surface, namely along its two diagonals and along its two medians.

Dance programs have been developed for operating in preferred manner with such dance mats, but also with conventional game pads. Such a program is described in above-mentioned Patent EP 1 127 599.

The user uses such a mat for interacting with a dance program operating on a digital processing unit having a screen as display means by pressing with the feet on the portions of the mat indicated on the screen by the game.

By pressing with the feet on the various portions of the mat, following sequences and rhythms specific to a given dance game operating on the digital processing unit, the player triggers signals transmitted to the digital processing unit and taken into account by the dance game. The player can then follow genuine choreographies for which an appraisal (correctness of placements of the feet on the pressure-sensitive portions and rhythm of placement of the feet) is indicated to the player as visual and audio feedback by the dance game.

The rest position of the user is the position in the center of the mat in which the user's feet stand on that portion of the mat which is not pressure-sensitive. The position in the center of the mat is not distinguishable by the mat from a position outside said mat since that position is characterized by inactivity of the pressure-sensitive surface making up the mat.

It should be noted that the signage of a dance mat is very similar to the signage of a conventional game pad and that dance videos for home consoles and for dance mats can be played fully with a conventional game pad.

Such dance mats and their associated programs thus make it possible for users to perform interactive dance activities whose corpus of movements is limited to the types of interaction that said mat can sense, namely to movements of the feet on an entirely plane surface having a non-interactive portion at its center.

Furthermore, exercise or fitness accessories are tending to become increasingly interactive. That applies, for example, to an interactive exercise bike that interacts, via the movement of its crankset and of buttons situated on the handles, with games operating on a game console. Similarly, certain rowing machines and treadmill running machines are provided with screens displaying rowing race images or cross-country landscapes.

In the same spirit, U.S. Pat. No. 5,507,708 makes it possible to do "stair climbing" type gymnastics while interacting with a video game machine.

Unfortunately, none of those accessories make it possible to do interactive exercise having the characteristics of stepping type exercise which is characterized by choreography around and on a rectangular block.

SUMMARY OF THE INVENTION

The present invention aims to remedy the drawbacks of the prior art by means of an original association of three elements: pressure-sensitive surfaces, an object of shape similar to a rectangular block shape, and an image and sound method for a digital processing unit. The invention aims to provide a system designed in particular for enabling a user equipped with said system to do stepping exercise interactively.

The device of the invention makes it possible to do interactive and fun sessions of a type of gymnastics centered around an accessory known as an "exercise step".

To this end, the present invention provides a device for doing interactive gymnastics in association with an image and sound system constituting the gymnastics program to be followed by the user, said device comprising a first level of pressure-sensitive surfaces which extend substantially continuously and substantially in the same plane, said device being characterized in that it further comprises at least a second level of pressure-sensitive surfaces, said surfaces of said second level extending substantially continuously and substantially in the same plane.

A pressure-sensitive surface is characterized by the fact that, when a mechanical pressure is exerted on such a surface (a pressure from the foot, for example), a modification takes place in the electrical properties of said surface compared with its electrical properties while no pressure is being exerted on it. Such surfaces can act, in particular, as all-or-nothing switches actuated by the feet.

A conventional modification in the electrical properties of the surface consists in closing or opening an electrical circuit depending on whether a pressure is being exerted on the surface. In which case, the pressure-sensitive surface acts as an all-or-nothing switch.

The pressure-sensitive surfaces making up the device of the invention and whose shapes and configurations are described in detail below are interconnected and they surround a protuberant object.

The surfaces extend substantially continuously so that a user can easily slide his or her feet from one surface to another surface situated in alignment therewith without any difficulty and without any hindrance or discomfort.

Preferably, the plane of said first pressure-sensitive surfaces consists in a mat. Also preferably, the plane of said second pressure-sensitive surfaces consists in the top face of a protuberant object that is in the shape of a parallelepiped block and that is referred to below as "the block".

Advantageously, the block is situated in the center of the mat.

Advantageously, the block has a length lying in the range 70 centimeters (cm) to 100 cm, a width lying in the range 20 cm to 40 cm, and a height lying in the range 10 cm to 30 cm.

Advantageously, the block may be provided with a height adjustment mechanism suitable for increasing or for reducing the height of said block, e.g. by raising or lowering the top face of the parallelepiped block.

In a possibility offered by the invention, the parallelepiped block is provided with four legs disposed at its four corners and serving as a stand for said block. In which case, the legs may consist in elements in the shape of parallelepiped blocks, the length, height, and width dimensions of each block being mutually different.

Advantageously, each leg has at least one means for fastening to the block, ideally one fastening means per pair of parallel faces.

In another embodiment of the invention, the device has four pressure-sensitive surfaces on said block.

The four surfaces extend substantially continuously so that a user can easily slide his or her feet from one surface to another surface without any difficulty and without any hindrance or discomfort.

Advantageously, one of the pressure-sensitive surfaces consists in at least part of the periphery of the top face of the block, and surrounds, at least in part, the other pressure-sensitive surfaces situated on the top face of the block.

In an embodiment of the invention, the device has at least four pressure-sensitive surfaces in the first plane.

In a particular embodiment of the invention, the device has eight pressure-sensitive surfaces in the first plane, which surfaces are disposed symmetrically about a center of symmetry, namely two in front of the block, two behind the block, two on the right and two on the left.

Ideally, the mat has a central rectangular portion not provided with said pressure-sensitive surfaces and for receiving and optionally for fastening to said parallelepiped block.

In an embodiment of the invention, the surfaces of the first level and the surfaces of the second level are connected to the image and sound system via an electrical wired network.

In different manner, the surfaces of the first level and the surfaces of the second level are connected to the image and sound system via a wireless link, e.g. via electromagnetic pulses and tags of the RF-ID type, said system then having a specific receiver.

Advantageously, the device of the invention may have at least one control button situated on the first level, on the second level of pressure-sensitive surfaces, or on one of the faces of the block, and suitable for acting on the image and sound system.

In a possibility offered by the invention, the device may have at least one vibration or impact sensor optionally connected to at least one pressure-sensitive surface in order to compare different pressures.

Advantageously, the information recorded by the sensor is sent to the image and sound system for processing or is transmitted directly to the user, e.g. via audio and/or visual signals.

Advantageously, the device of the invention has a plurality of connectors for interconnecting the sensitive surfaces, said connectors being removable for using only some of said sensitive surfaces.

In a possibility offered by the invention, the parallelepiped block is provided with at least one recess suitable for stowing the mat and the connectors.

In an embodiment, the sensitive surfaces of the first plane are removable, the number of them and the distance between them being variable.

The device of the invention offers an innovation in the field of interactive games and exercise insofar as no exercise accessory or game peripheral exists that makes possible to do interactive stepping sessions.

The device of the invention is designed specifically so that it is possible to input and to interact with the movements specific to gymnastic activities of stepping type, which cannot be done by other peripherals for digital processing units.

The device of the invention makes it possible, by means of the extra motivation given by the interaction, to go through the stepping learning period more easily, while being immediately gratified by the pleasure of the interactive approach and of fun challenges.

In addition, the device of the invention also constitutes an invention that is complementary to other interactive products (image capture, body movement capture, etc.). It can thus be integrated into unprecedented virtual-reality games, experiences or leisure activities.

The device of the invention can both be used by users doing interactive gymnastics on their own, and also be a peripheral made available to participants in lessons in sports centers or in arcades.

BRIEF DESCRIPTION OF THE DRAWINGS

The invention will be better understood on reading the following description of an embodiment of the invention given merely by way of explanation and with reference to the accompanying figures, in which.

DETAILED DESCRIPTION OF THE INVENTION

The device of the invention is provided with a plurality of pressure-sensitive surfaces, the number and layout of which vary depending on the embodiments.

An embodiment of a pressure-sensitive surface consists in forming a surface in which two conductive plane plies are separated by a foam-type material in which a plurality of orifices of sufficient diameter have been formed.

At rest, when no external pressure is exerted on the pressure-sensitive surface, the expansion force of the foam-type material keeps the two conductive plies apart and opens the electric circuit of which said plies are the ends.

When pressure greater than the expansion force of the foam-type material is exerted, the two conductive plies meet and touch through the orifices in the foam-type material, thereby closing the electrical circuit of which said plies are the ends.

The shape, the dimensions and the physical qualities (in particular the elasticity and the strength) of the block of the device of the invention are chosen such as to be comparable to the corresponding shapes, dimensions and qualities of exercise step devices as they currently exist, in order to enable users of the device of the invention to have the same physical sensations when using the block as the physical sensations experienced with a conventional exercise step.

The conventional exercise step has a shape lying within a parallelepiped rectangular block and has approximately the following dimensions: a length in the range 70 cm to 100 cm, a width in the range 20 cm to 40 cm, and a height that is variable and adjustable by the user depending on the difficulty of the exercises that the user wishes to do, from 10 cm to 30 cm.

The dimensions and the shape of the block of the device of the invention depend on the embodiments, but they remain comparable with the dimensions and the shape indicated for the conventional exercise step.

In addition, in a preferred embodiment, a mechanism makes it possible to vary the height of the top portion of the block, as in a conventional exercise step, in order to enable the user to vary the levels of difficulty of the exercises.

Figure 1:
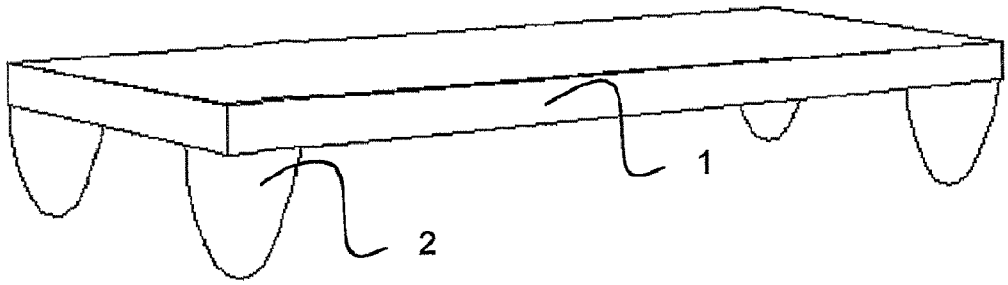
FIG. 1 is a perspective view of a parallelepiped block standing on four legs.

In an embodiment shown FIG. 1, the block is made up of a top portion 1 supported by four legs 2.

Figure 2:
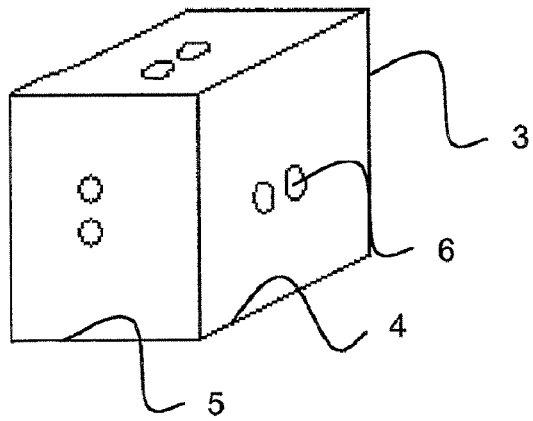
FIG. 2 is a perspective view of a leg on which the block shown in FIG. 1 stands.

In an embodiment provided with a mechanism making it possible to vary the height of the top portion of the block, said mechanism is made up of four legs, each of which is in the shape of a parallelepiped block whose three sides all have different lengths, each length corresponding to a specific height to which it is desired to be able to set the top portion of the block. The four legs are placed under the top surface of the block at the four corners thereof. Depending on which one of the three sides of the legs is used as the height, the top portion of the block is raised to a respective one of three different heights. One of the legs is shown in FIG. 2. The three sides 3, 4, and 5 are of different lengths. Possible means of securing the legs to the top portion of the block are shown at 6: these means are constituted by a pair of holes, the underside of the top portion of the block being provided with pegs that engage in said holes.

In another embodiment, with a mechanism making it possible to vary the height of the top portion of the block, said mechanism is made up of two legs, each of which is in the shape of a parallelepiped rectangular block whose three sides all have different sizes, two of said sizes corresponding to a specific height to which it is desired to be able to set the top portion of the block, the third length being equal to the width of the block. The two legs are constituted such as to be placed under the top surface of the block, at its narrowest ends. The underside of the top surface of the block is provided at those places with two reinforcements raising the block.

Figure 3B:
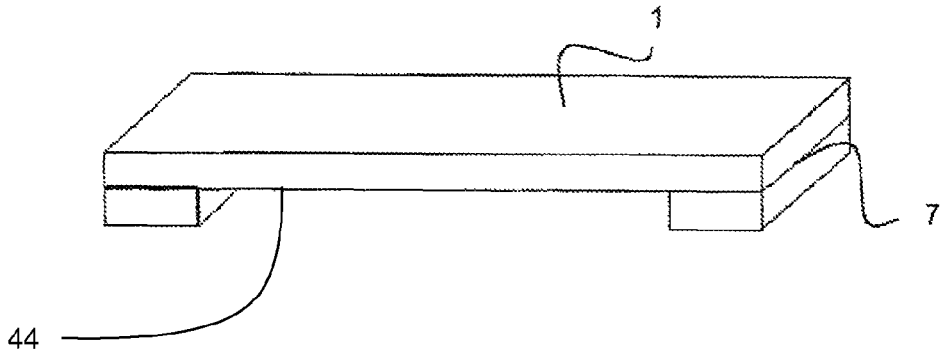
FIG. 3b is a perspective view of a parallelepiped block of the invention.
Figure 3A:
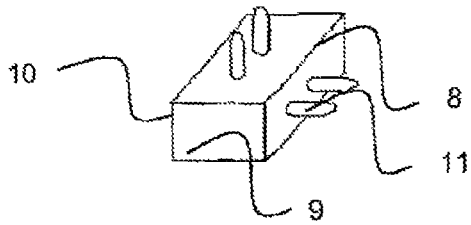
FIG. 3a is a perspective view of a leg for use with a parallelepiped block of the invention.

FIG. 3a shows a leg 8 with one side having the same width as the top portion of the block 1, and two other sides 9 and 10 of different lengths. Reinforcements 7 are also shown that give a certain height to the block even without adding the legs to it. That height corresponds to the minimum height at which the top surface has to be placed. FIG. 3b shows a parallelepiped block as used in the invention, having a recess 44 suitable for stowing the mat and the connectors.

Depending on whether the top portion is used as raised by its reinforcements only, or whether one of the two sides of the legs is fitted to said top portion, the top portion of the block is raised to three different heights. In this embodiment, the feet are provided with pegs 11 and the reinforcements of the top portion of the block are provided with holes into which said pegs come to engage in order to secure the top portion of the block to its legs.

At its top, the block is provided with a certain number of pressure-sensitive surfaces whose number and layout vary depending on the embodiments.

Figure 4:
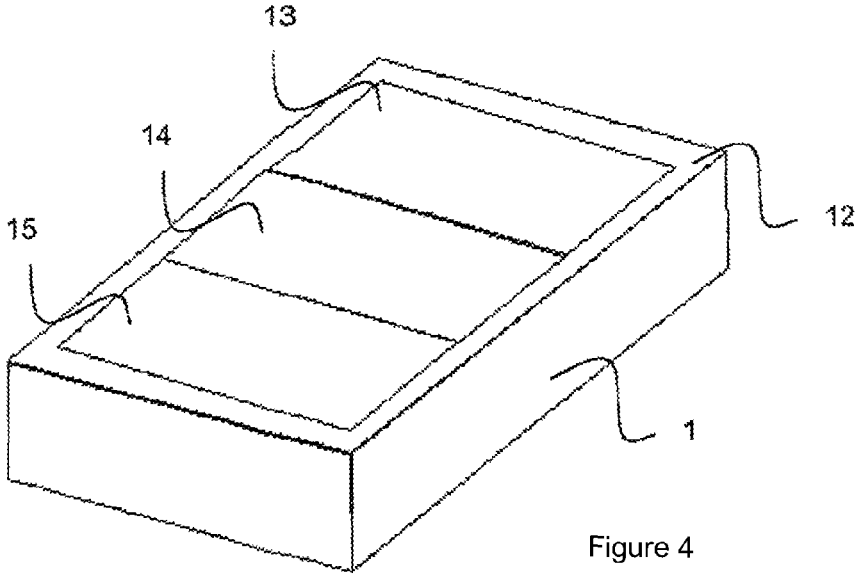
FIG. 4 is a perspective view of a variant of the block of the invention.

In an embodiment, shown in FIG. 4, there are four such pressure-sensitive surfaces situated on the top of the block 1.

Three surfaces, numbered 13, 14, and 15 in FIG. 4, subdivide the top into three portions: a left portion, a central portion, and a right portion.

The advantage of this subdivision into three portions is that this layout is pertinent relative to the corpus of movements characteristic of stepping gymnastics, which corpus distinguishes between the three zones for the main placements of the feet of the user on the exercise step.

Once the signals delivered from the three surfaces have been processed by the image and sound method operating on the digital processing unit connected to the device of the invention, said signals can relate to precise and pertinent information in the context of gymnastic movements of the stepping type as regards the locations of the feet of the user on the block.

A fourth surface 12 surrounds the top of the block, over a width of a few centimeters at the most.

The advantage of said fourth surface is to indicate interactively to the user that said user is overstepping the outline of the top portion of the parallelepiped, which is not recommended for some of the movements of gymnastics of the stepping type because it can generate high pressure at the Achilles tendon. Naturally, it is possible to use the signals from said fourth surface for other functions or features.

Around the block, a plurality of pressure-sensitive surfaces are disposed that are connected together and whose number and layout vary depending on the embodiments.

Distinctions can be made between four main zones in which the surfaces are disposed: in front of the block, behind the block, on the left side of the block and on the right side of the block. The advantage of such a subdivision into zones is that gymnastics of the stepping type makes distinctions in its choreography and in its steps between these four user approach paths relative to the exercise step.

Figure 5:
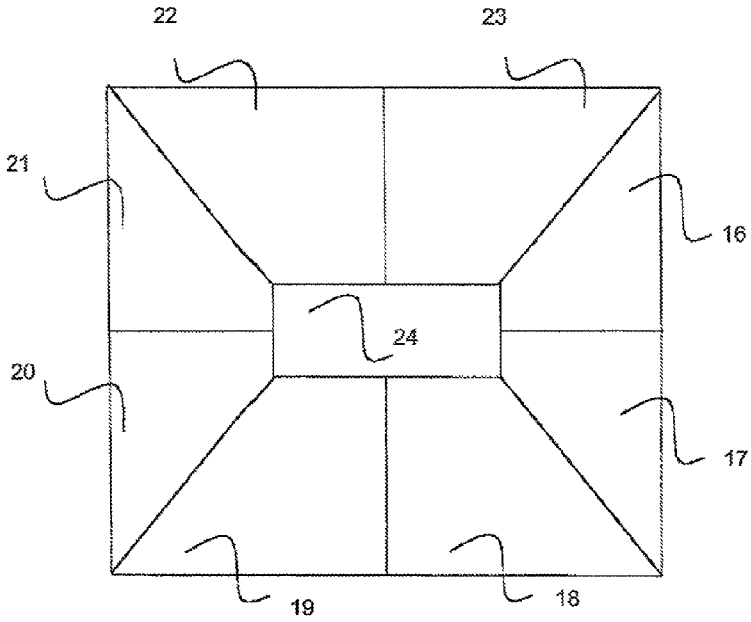
FIG. 5 is a plan view of the pressure-sensitive surfaces of the first plane.

In a preferred embodiment shown in FIG. 5, each of these four zones is subdivided into two so as to take account of an additional characteristic of stepping-type gymnastics in which many of the movements begin with both feet facing the face or the profile of the exercise step, and continue while distinguishing between the left and right sides for placing the feet next to the exercise step, whether the user be facing the profile or the face of the exercise step. Pressure-sensitive surfaces, disposed as indicated in FIG. 5, are capable of making these distinctions.

It should be noted that, in this preferred embodiment, the pressure-sensitive zones are not rectangular, and they are not disposed along axes of symmetry of the mat of the device of the invention, considered to be a plane rectangular surface, but rather on either side of said axes of symmetry.

Thus, in a preferred embodiment shown in FIG. 5, there are eight pressure-sensitive surfaces situated around the block, numbered from 16 to 23 in FIG. 5 and disposed as follows: two in front of the block, two behind it, two on the left, and two on the right.

In the center of the entire set of said surfaces, a rectangular space is shown at 24 where the block is placed.

In a preferred embodiment, the sensitive surfaces have the strength, friction tolerance, and non-slip qualities expected for the surface of an exercise step and for the surface of a gymnastics mat. These qualities can be different depending on the locations and on the use of the surfaces in the device of the invention.

The pressure-sensitive surfaces, which are both around and on the block, are interconnected. Each of them can cause a different signal to be generated when pressure is exerted on it.

The signals generated by pressing on these surfaces are transformed so as to be interpretable by the digital processing unit to which the device of the invention is connected and to which the device of the invention transmits the signals.

The device of the invention is connectable to a digital processing unit.

In an embodiment, such connection is achieved by means of a cable provided with a suitable connector.

In another embodiment, such connection is achieved by means of a wireless link.

In which case, a receiver is connectable to the digital processing unit and a transmitter is connected to the entire set of the pressure-sensitive surfaces.

Figure 6:
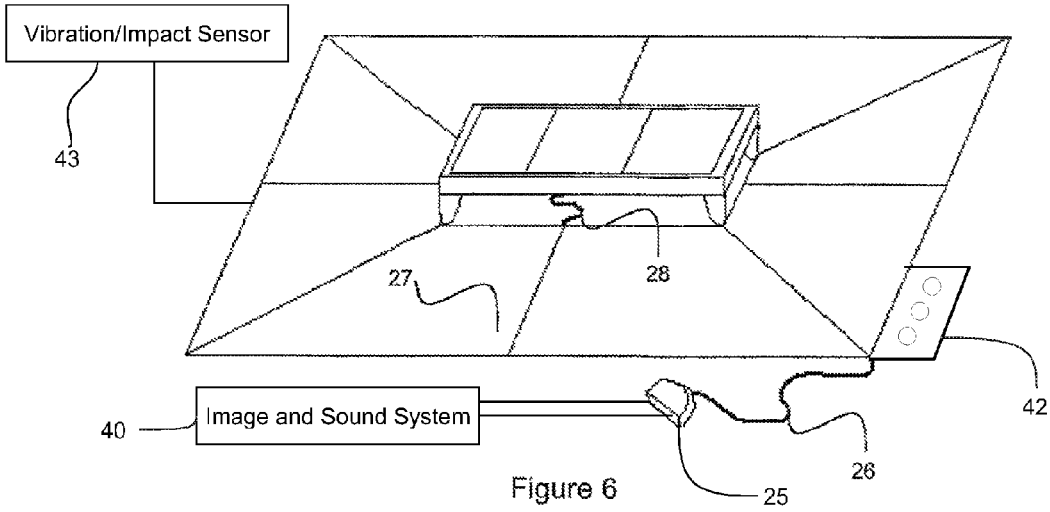
FIG. 6 is a perspective view of the whole device, i.e. both with the sensitive surfaces of the first plane and also with the sensitive surfaces of the second plane.

In an embodiment shown by FIG. 6, the pressure-sensitive surfaces, situated on the surface of the top of the block are connected to one another and to the other sensitive surfaces around the block by a set 28 of electrical wires passing through the top surface of the block, and then passing under the block while then being connected to the other pressure-sensitive surfaces 27 situated around the block. The entire set is then connectable to a digital processing unit or image and sound system 40 via a cable 26 or a wireless link (not shown in FIG. 6) and via a suitable connector 25.

In an embodiment, the device is provided with signal-generating control buttons 42 situated at the peripheries of the sensitive surfaces situated around the block. The signals generated by said buttons are also transmitted to the digital processing unit. The buttons can be placed on one or more specific supports and can be supplemented with diodes or with various other elements for increasing the pleasure and the variety of use.

In an embodiment, signal-generating control buttons situated on the block supplement the device of the invention. The signals generated by these buttons are also transmitted to the digital processing unit.

The buttons are placed such that the user cannot accidentally actuate them by doing interactive gymnastics. Thus, they can be situated on the vertical sides of the block or they can require two "presses" in succession or one long "press".

In an embodiment, each of the signals transmitted by the device of the invention is accompanied by a specific signal making it possible to identify that the transmitter of the signals is a peripheral of the same category as the device of the invention. Such an identifier signal makes it possible, for example for competitions or networked game sessions, to ensure that all of the competitors are equipped with peripherals of the same type as the device of the invention.

In an embodiment, one or more vibration or impact sensors are placed on the block so as to evaluate the degree of violence with which the user steps onto the block.

In an embodiment, one or more vibration or impact sensors 43 are connected to the pressure-sensitive surfaces in order to evaluate the degree of violence with which the user shifts his or weight onto said surfaces.

In the embodiment with vibration or impact sensors, the information coming from said sensors can be transmitted to the digital processing unit which returns the information in a fun or instructional form to the user.

In another embodiment with vibration or impact sensors, said information is transmitted directly to the user, without going via the digital processing unit, by means of light or sound signals that vary depending on the intensity of the impact and transmitted directly by the device of the invention.

The number of distinct signals generated by the device of the invention and transmitted to the digital processing unit is less than or equal to the numbers of pressure-sensitive surfaces making up the device of the invention, added to which, there are any signals coming from any vibration or impact sensors and any signals coming from any control buttons placed on the block or at the peripheries of the surfaces situated around the block. In all cases, it should be noted that the number of distinct signals that the device of the invention can generate is greater than the number of distinct signals that a conventional dance mat can generate. This larger number of signals corresponds to the specific requirements of the use of the device of the invention in the context of interactive gymnastics of the stepping type.

In an embodiment, light-emitting diodes are placed on, under, or in the vicinity of the pressure-sensitive surfaces and they indicate to the user, by means of a light signal, either that surface on which the user has just pressed, or, for example, in a learning or game context, that surface on which the user should press or ought to have pressed. These different functions or features could be managed by the image and sound method operating on the digital processing unit to which the device is connected.

In an embodiment, in order to reduce the amount of space that the device of the invention occupies when stowed away, the various pressure-sensitive surfaces disposed around the block can be placed inside said block.

In an embodiment, the electrical connection between the block and the pressure-sensitive surfaces disposed around the block is not achieved via a permanent link, but rather it is achieved via connectors that can be connected or disconnected at will. The advantage of such an embodiment is that it makes it possible for the user to disconnect the block from the surfaces disposed around it and to change the block with another interactive block of the same type, having the appropriate connector, but having other qualities (different shape, possibility of other height adjustments, better resistance to weight or to impacts, different elasticity, etc.). The new block is connected to the surfaces disposed around it.

Figure 7:
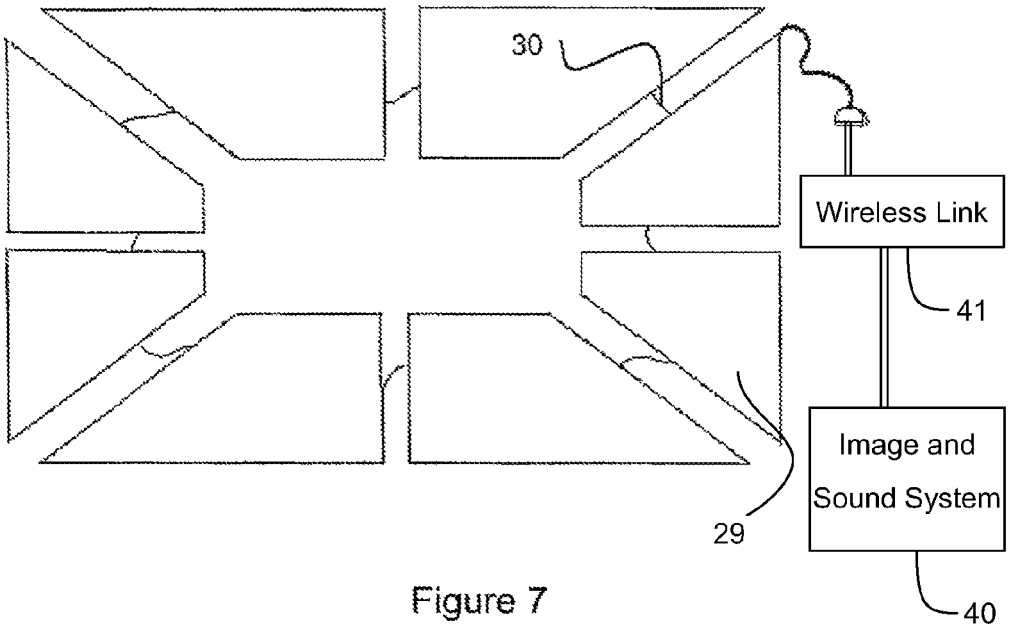
FIG. 7 is a plan view of the pressure-sensitive surfaces forming the first plane, as disunited from one another but while still being electrically interconnected.

In an embodiment shown in FIG. 7, the various pressure-sensitive surfaces surrounding the block can be spaced apart from one another by a given distance, while remaining connected together. The advantage of such an embodiment is to cause the area over which the surfaces situated around the block extend to vary, and thus to extend the interactive perimeter around the block, and also to cause the size of the location situated in the center of said surfaces and dedicated to the block to vary. The user can thus use blocks occupying different floor areas. In FIG. 7, one of the pressure-sensitive surfaces is indicated at 29, one of the electrical connections between the surfaces is indicated at 30, and a wireless link connecting the surfaces to the digital processing unit or image and sound system 40 is indicated at 41.

In this embodiment, it is possible to reinforce the strength with which the surfaces are secured together, e.g. with strips of Velcro (registered trademark) fabric. It is possible thus to have strips of female Velcro fabric sewn onto the surfaces, and to equip the user with strips of male Velcro fabric for connecting together the strips of female Velcro fabric of the surfaces.

Figure 8:
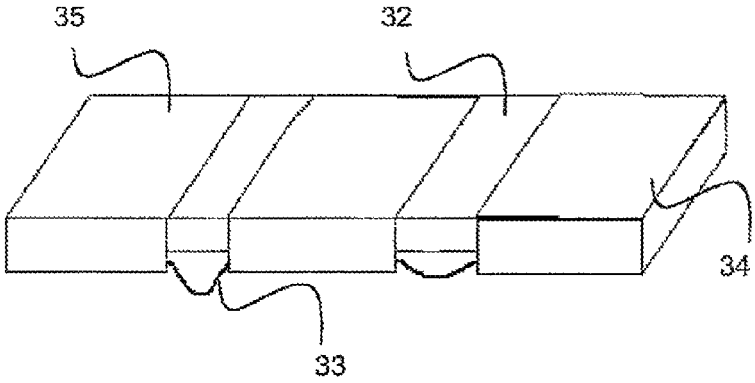
FIG. 8 is a perspective view of a variant embodiment of the block of the invention, in which embodiment the sensitive surfaces situated on the block are disunited from one another but are still electrically interconnected.

In an embodiment shown in FIG. 8, the various pressure-sensitive surfaces situated on the block can be disunited from the block and moved apart from one another while remaining electrically interconnected.

Three pressure-sensitive surfaces can be disposed as follows: two at the corners of the top portion of the block, and a third between the first two pressure-sensitive surfaces. The advantage of this embodiment lies in the fact that it makes it possible to cover pressure-sensitive surfaces and thus to make a non-interactive exercise step already in the user's possession interactive, that exercise step then taking the place of the block of the device of the invention. At 35, FIG. 8 shows one of the pressure-sensitive surfaces, at 33, it shows a cable interconnecting the various surfaces, and at 32, it shows the top portion of a non-interactive exercise step. The pressure-sensitive surfaces are fitted to the top portion of the non-interactive exercise step, e.g. by means of lips 34 or of adhesive portions.

Another embodiment with pressure-sensitive surfaces situated on the top portion of the block and having the possibility of being spaced apart is obtained by interconnecting the pressure-sensitive surfaces by means of an elastic woven fabric that can be fitted tightly around the block. Such a fabric is of dimensions designed to adapt to match the majority of top surfaces of non-interactive exercise steps and to remain united therewith.

In an embodiment, the pressure-sensitive surfaces of the block are not placed on the block but rather under said block. The manner in which the user shifts his or her weight onto and brings his or her feet onto the top of the block is then re-transcribed mechanically onto said pressure-sensitive surfaces and causes them to generate signals that are transmitted to the digital processing unit so as to be interpreted by it. In this embodiment, there are two pressure-sensitive surfaces, situated under the block, and they are placed respectively under the left leg and under the right leg supporting the block. Naturally, it is possible for more than two pressure-sensitive surfaces to be provided side-by-side under the block, in particular when the block has no legs and when its weight is supported by its entire bottom surface. The pressure-sensitive surfaces send a signal that varies depending on the weight that they support, this makes it possible to calibrate the device of the invention in a manner such that it recognizes the weight of the block on its own, and, by means of the difference between the signals transmitted by said surfaces, to estimate by means of the weight of the user when the user is on the block whether said user is on one or the other of or in between said surfaces. The advantage of this embodiment is to make it possible to use a non-interactive exercise step with the device of the invention.

For the above-described embodiment, it is possible to use analogue pressure sensors such as atmospheric pressure sensors connected to gas pockets lying within the sensitive surfaces situated under the block, and sending an electrical signal as a function of the atmospheric pressure of each air pocket, which pressure is itself as a function of the weight being exerted on the block. Comparison of the signals sent the sensors makes it possible to evaluate a pressure differential exerted by the block on the sensitive surfaces supporting it, and therefore to evaluate the position of the user. It is also possible to use one or more differential pressure sensors connected to the entire set of gas pockets lying within the surfaces placed under the block so that it is possible to obtain, in particular, a differential of the pressures exerted by the left and the right sides of the block. Other non-limiting embodiments use sensors based on piezoelectric crystals or strain gauges, sending an electrical signal or having a variation in one of their electrical qualities (such as resistance, for example) as a function of deformation when the surface with which they are associated is subjected to deformation. The sensors can be associated with the surfaces placed under the block. Evaluation of the pressure differential exerted by the block on the surfaces placed under the block can then be achieved by comparing the signals sent by said sensors or the variations in said electrical quality, which signals or variations in quality are generated by deformation of said surfaces due to the pressure exerted on them by the block.

In an embodiment, each pressure-sensitive surface has a wireless transmitter. The signals generated by the surfaces are transmitted, via their wireless transmitters, to a receiver connected to the digital processing unit that makes said signals interpretable by said digital processing unit. The advantage of such an embodiment lies in the fact that the various pressure-sensitive surfaces no longer need to be electrically interconnected.

In an embodiment in which each pressure-sensitive surface has a transmitter, each pressure-sensitive surface is connected to a transmitter of Radio-Frequency Identification (RFID) technology. A switch dependent on the pressure exerted on the surface makes said transmitter operational or non-operational, resulting in information being transmitted to the associated RFID receiver indicating whether or not the user is exerting a pressure on said surface. RFID technology is chosen because this technology is based on transmitters that are very inexpensive and it is capable of managing simultaneous signals correctly both for transmission and for reception, as is necessary in the imagined use of the device of the invention.

In an embodiment, the number of different signals transmitted by the device of the invention to the digital processing unit is less than or equal to the number of different signals transmitted by a conventional game pad to a game console and interpretable by said game console. The advantage of this embodiment lies in the fact that the invention can be connected more easily to a game console.

The object of the image and sound method is to propose a stepping interactive gymnastics session.

In an example of such a method, a virtual avatar represents an instructor giving the lesson who presents the movements to be made. Among such movements, distinctions are made between basic steps, advanced steps, and choreographies which are sequences of basic or of advanced steps. Principles or examples are given by means of video sequences.

The user is also represented by an avatar whose movements are deduced from the signals coming from the pressure-sensitive surfaces of the device of the invention. The virtual professor reacts as a function of the performance (rhythm, movements, etc.) of the user, by adapting the level of difficulty or by proposing new exercises.

There are a plurality of modes of play, in particular a "competition" mode in which virtual characters controlled by the program challenge the users to follow them in choreographies or in steps of varied complexity, a learning mode in which the user can learn and become informed of the steps and choreographies of stepping, a game mode in which steps and choreographies make it possible to the avatar of the user to take tests and to experience adventures, and a network mode using the Internet and in which the avatar of the user interacts, e.g. within a "group" interactive stepping lesson, with avatars of other, remote users.

The image and sound method stores the performance of the user, indicates, in particular, estimations and histories of the number of steps made, of the calories "burnt", of the levels of difficulty achieved, and uses the data of the user to encourage effort in personalized manner.

The invention is described above by way of example. It is understood that the person skilled in the art is capable of achieving various variants of the invention without going beyond the ambit of the patent.

What is claimed is:

1. A device for performing interactive gymnastics in association with an image and sound system that includes a gymnastics program to be followed by a user, said device comprising a protuberant object in the shape of a parallelepiped block, said block comprising[;]*:* one top surface for receiving the feet of a user;

at least two analog weight sensors each able to send to the image and sound system a signal that varies depending on the weight applied by the feet of the user on the top surface for causing an action to take place in response to the signal*;*

*at least one command button located on a vertical face of said block.*

2. The device according to claim 1, wherein said weight sensors are located under said block.

3. The device according to claim 2, wherein said block comprises four weight sensors under said block.

4. The device according to claim 3, wherein said block comprises four legs located under said block.

5. The device according to claim 4, wherein said weight sensors are pressure-sensitive sensors.

6. The device according to claim 5, wherein the signal sent to the image and sound system causes a response in a choreography program.

7. The device according to claim 5, wherein the signal sent to the image and sound system causes a response in a step program.

8. A method for performing interactive gymnastics in association with an image and sound system, said method comprising the steps of:

providing a device according to claim 1;

applying weight on the top surface by the feet of a user; and sending to the image and sound system a signal from at least one analog weight sensor that varies depending on the weight applied by the feet of the user.

9. [A] *The* method according to claim 8, wherein the signal sent to the image and sound system causes a response in a choreography program.

10. [A] *The* method according to claim 8, wherein the signal sent to the image and sound system causes a response in a step program.

*11. A device for doing interactive gymnastics in association with an image and sound system constituting a gymnastics program to be followed by a user, said device being a protuberant object in the shape of a block, said block comprising:*

*one top surface for receiving the feet of a user;*

*at least two analog weight sensors each able to send to the image and sound system a signal that varies depending on the weight applied by the feet of the user on the top surface for causing an action to take place in response to the signal;*

*at least one command button located on a vertical face of said block.*

*12. The device of claim 11, wherein the block is parallelepiped.*

*13. The device of claim 11, wherein each of said signals transmitted by said at least two weight sensors is accompanied by a specific identifier signal making it possible to identify the device.*

*14. The device of claim 11, wherein said device recognizes the weight of said block.*

*15. The device of claim 14 wherein said device is self-calibrating.*

*16. The device of claim 11 wherein said device calculates a difference signal between said signals transmitted by said at least two analog weight sensors.*

*17. The device of claim 16 wherein said device estimates from said difference signal a location on said top surface at which said user has applied weight.*

*18. The device of claim 17 wherein said device estimates from said difference signal whether said user has applied weight to one or the other of said at least two analog weight sensors.*

*19. The device of claim 17 wherein said device estimates from said difference signal whether said user has applied weight in between said at least two analog weight sensors.*

*20. The device according to claim 11, wherein said at least two weight sensors are located under said block.*

*21. The device according to claim 20, wherein said block comprises four weight sensors located under said block.*

*22. The device according to claim 21, wherein said block comprises four legs located under said block.*

*23. The device of claim 22, wherein said block comprises a mechanism for increasing or reducing the height of said top surface.*

*24. The device of to claim 11 wherein said at least two weight sensors are pressure-sensitive sensors.*

*25. The device of to claim 11 wherein said block comprises Light Emitting Diodes (LEDs).*

*26. The device of claim 11 wherein the signals sent to the image and sound system cause a response in a choreography program.*

*27. The device of claim 11 wherein the signals sent to the image and sound system cause a response in a step program.*

* * * * *